Sept. 13, 1932.  A. F. McCLAIN, SR  1,877,471
RACE TRACK
Filed Dec. 8, 1931
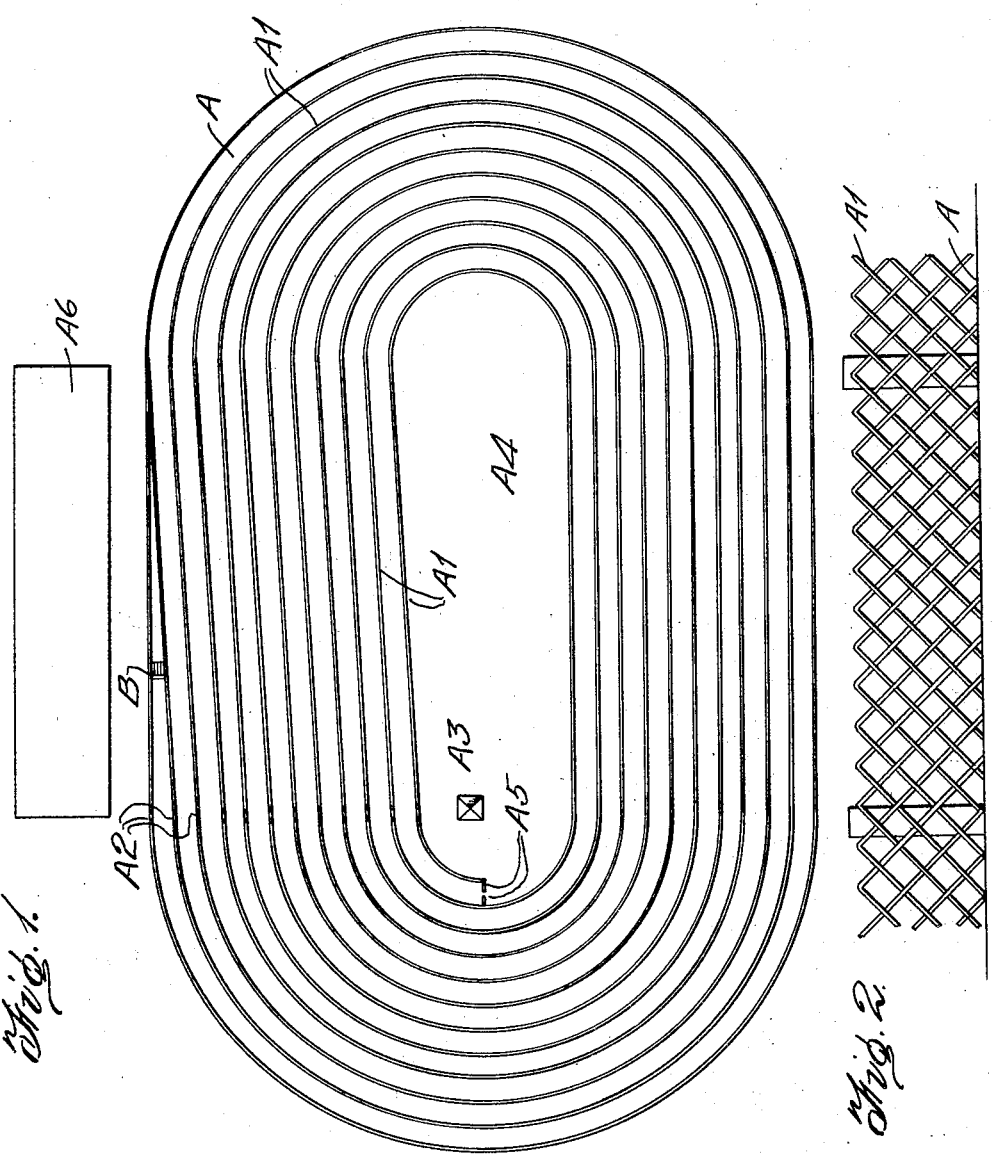
INVENTOR.
A. F. McClain Sr
BY
ATTORNEY Patented Sept. 13, 1932

1,877,471

UNITED STATES PATENT OFFICE

ALLEN FRENCH McCLAIN, SR., OF KNOXVILLE, TENNESSEE

RACE TRACK

Application filed December 8, 1931. Serial No. 579,774.

This invention relates to an improvement in race tracks in which the track is constructed in a general spiral shape for the training and racing of foxes, rabbits and other animals to be chased by hounds or the like.

The object of the invention is to provide a track in a spiral shape such that the races will be completed without the dogs and foxes or rabbits being out of the hearing or sight of observers. This will enable persons who witness the races to do so without exposure or travel as has heretofore been necessary in order to see the entire track. This is accomplished by making the track in the form of a spiral with the convolutions thereof disposed wholly on the ground or in a horizontal plane. A continuous spiral shaped fence may be constructed in order to form the race track.

In the accompanying drawing:

Fig. 1 is a top plan view of my race track and Fig. 2 is a detail side elevation of a portion of the fence.

The race track is shown in Fig. 1 as being formed in a general spiral shape and is designated A, being formed by a continuous fence A1 which is arranged with its convolutions in a horizontal plane and of the length that it is desired for the race track. This fence A1 has gates A2 therethrough which lead to a judging stand A3 arranged within the enclosed space A4 which is formed at the center of the spiral race track. This enclosed space A4 may be used as the home of the chased animals such as rabbits, foxes, deer, or the like, and access to it is controlled by one or more gates A5 at the inner end of the fence A1. As shown in Fig. 2 this fence A1 should preferably be of some kind of woven wire or the like to safely enclose the animals while yet not obstructing the view thereof of observers who may watch the races from a grand stand A6 located beside the track. Where the track is to be used at night it should be fully illuminated throughout its length for observation of the races.

Located at the starting end of the track A is a starting trap B, which may be of a structure such as set forth in my application Serial No. 596,638, filed March 3, 1932.

I claim:
1. A trackway made in a general spiral shape with more than a complete convolution thereof arranged approximately in a horizontal plane.
2. A racing trackway arranged in spiral shape with a plurality of convolutions thereof disposed approximately in the same horizontal plane.
3. A racing trackway arranged in spiral shape with a plurality of convolutions thereof disposed approximately in the same horizontal plane, and an enclosure at the center of the spiral and communicating with the inner end thereof.

In testimony whereof I have signed my name, this 23rd day of November, in the year one thousand nine hundred and thirty one.

ALLEN FRENCH McCLAIN, SR.